United States Patent [19]

Whitener et al.

[11] Patent Number: 4,674,712

[45] Date of Patent: Jun. 23, 1987

[54] DOUBLE-LOBE FUSELAGE COMPOSITE AIRPLANE

[75] Inventors: Philip C. Whitener; Ray Olason, both of Seattle, Wash.

[73] Assignee: The Boeing Company, Seattle, Wash.

[21] Appl. No.: 693,570

[22] Filed: Jan. 22, 1985

[51] Int. Cl.⁴ ............................................. B64C 1/00
[52] U.S. Cl. .................................... 244/119; 244/131
[58] Field of Search ................... 244/117 R, 119, 120, 244/131, 133; 52/69, 71, 70

[56] References Cited

U.S. PATENT DOCUMENTS

| | | | |
|---|---|---|---|
| 2,078,544 | 4/1937 | Salzman et al. | 244/117 R |
| 2,432,396 | 12/1947 | Earhart | 244/124 |
| 3,002,717 | 10/1961 | Pavlecka | 244/124 |
| 3,285,540 | 11/1966 | Lee | 244/131 |
| 3,405,893 | 10/1968 | Flamand et al. | 244/119 |
| 3,415,468 | 12/1968 | LaBombarde | 244/87 |
| 3,487,888 | 1/1970 | Adams et al. | 244/54 |
| 3,769,765 | 11/1973 | Wright | 52/69 |
| 4,256,790 | 3/1981 | Lackmon et al. | 244/133 |
| 4,344,995 | 8/1982 | Hammer | 244/133 |

Primary Examiner—Galen Barefoot
Assistant Examiner—Mark R. Valliere
Attorney, Agent, or Firm—H. Gus Hartmann; B. A. Donahue

[57] ABSTRACT

Design and construction of a composite material airplane having a high aspect-ratio wing and a horizontal double-lobe fuselage cross-section for cargo and/or passenger accommodations. The fuselage comprises a double-lobe shell of contoured honeycomb core composite panels and an interior vertical plane centerline web forming a divider between the lobes. Piano-hinge type joints are utilized for multi-panel junctures to provide uniform load distribution across the junctures. The piano-hinge juncture utilizes hinge lugs which are dimensioned to interface sequentially along the hinge axis, and the hinge lugs are interconnected by a tubular hinge pin.

17 Claims, 15 Drawing Figures

DOUBLE-LOBE FUSELAGE COMPOSITE AIRPLANE

SUMMARY OF THE INVENTION

The invention is directed to an all composite material type construction of a horizontal double-lobe fuselage and more particularly to connections or joints therefor which facilitate assembly of multi-panels.

In the design and construction of composite material structures comprised, at least in part, of composite material sandwich components, one of the most difficult problems involves joining the sandwich components to each other with adequate provisions for load transfers without resorting to the use of machined metal parts and/or conventional fasteners. Using complex metal parts and/or conventional fasteners tends to strongly negate the advantages of composite material structure over equivalent conventional structure.

A significant part of the problem of providing uniform load distribution across junctures between components of sandwich structure stems from the nature of the cores used in the sandwich structure, i.e., honeycomb. The structural characteristics of honeycomb are well known, and a primary one is that while it has good strength in the direction parallel to the cell walls and in shear i.e., loads in opposite directions at and parallel to the skins, it is weak under compression loads on and normal to the cell walls. The honeycomb core is able to contribute very little toward transferring out-of-plane loads between the skins and adjacent skins.

Therefore, for multi-panel interconnection, the present invention utilizes a piano-hinge type joint; wherein spaced lugs alternately interfit and are interfastened by a long tube threaded through lug holes. This type of joint is designed to distribute loads evenly, minimize fasteners and fastener installation, and more easily implement the transfer of loads from the composite panel structure into the joint.

Production construction techniques for large passenger airplanes, utilizing all composite materials, differ substantially from the conventional aluminum metal fabricating methods; such that airplane aerodynamic design improvements can be achieved with composites that were not considered possible with all metal fabrication. Further, if the same type of construction tecniques were used with composite materials, as with aluminum, there would be substantial weight penalties.

An object of the invention is to provide an airplane design having a horizontal double-lobe fuselage construction; wherein a substantial length of the fuselage is of a circular cross section with a constant radius which facilitates construction with composite materials. Also, variation of the overall cross-sectional area of the double-lobe fuselage is obtained by varying the distance between the centers of constant radii.

Another object of the invention is to provide a double-lobe fuselage construction utilizing longitudinal piano-hinge type joints which are designed to distribute structural loads evenly and more easily implement the transfer of structural loads between honeycomb composite material panels, through proper interspace dimensioning of adjoining panels along a common hinge axis.

Advantages of a piane-hinge type joint are that it is compact, structurally tailorable, efficient, easy to manufacture and assemble. Further, the joint helps to avoid concentrated loads, accommodates the variation in angles between the joined panels, and is entirely compatible with composite materials structure.

Another advantage of a double-lobe fuselage construction is that there is an adequate lateral spread within the confines of the fuselage to provide structural support for a main wide-tread landing gear; i.e., due to the added width of a double-lobe fuselage vs. a single-lobe fuselage, it isn't necessary to provide a structural support which extends substantially outboard from the sides of the fuselage for the landing gear as would be required for mounting a main landing gear with adequate tread spread to a single-lobe fuselage.

Another advantage of a double-lobe fuselage construction is that there is no additional drag penalty due to extraneous bulge fairings encasing the landing gear, as would be necessary for a turnion support structure extending substantially outboard from the sides of a single-lobe fuselage for providing tread spread to an extended main landing gear.

Another advantage of a double-lobe fuselage design is that there is sufficient width for area-rule design or coke-bottle narrowing of the fuselage, which is generally required to meet transonic airflow requirements, and still leave sufficient cross-sectional area for adequate structural support of aft mounted engines and empennage.

DESCRIPTION OF THE PREFERRED EMBODIMENTS

FIGS. 1 to 4 show a subsonic airplane designed with all structural elements fabricated from composite materials and utilized for passengers and/or cargo, comprising: a wide-body fuselage generally indicated at 1, having a fore-body flight crew station and cockpit 1A; a mid-body or center-body section 1B, having two horizontally adjacent lobes or double lobes of equal radius of curvature; and an aft-body section 1C which is necked-in or coke-bottle shaped to a wedge-shaped end 2. The aft-body section 1C also has a V-tail empennage 3 with spanwise segmented trailing edge control surfaces 4 which combine the functions of both a rudder and an elevator, or "ruddervators"; and horizontal struts 5 from each side of the fuselage for mounting a power plant 6.

A high aspect ratio wing 8, with spanwise segmented trailing edge control surfaces 9 which combine the functions of both aileron and flap, or "flaperons," is mounted to the fuselage 1 through a wing root joint 10 at the longitudinal centerline of the fuselage; whereas, a conventionally designed airplane generally has a structural wing center section spanning the width of the fuselage.

Figure 2:
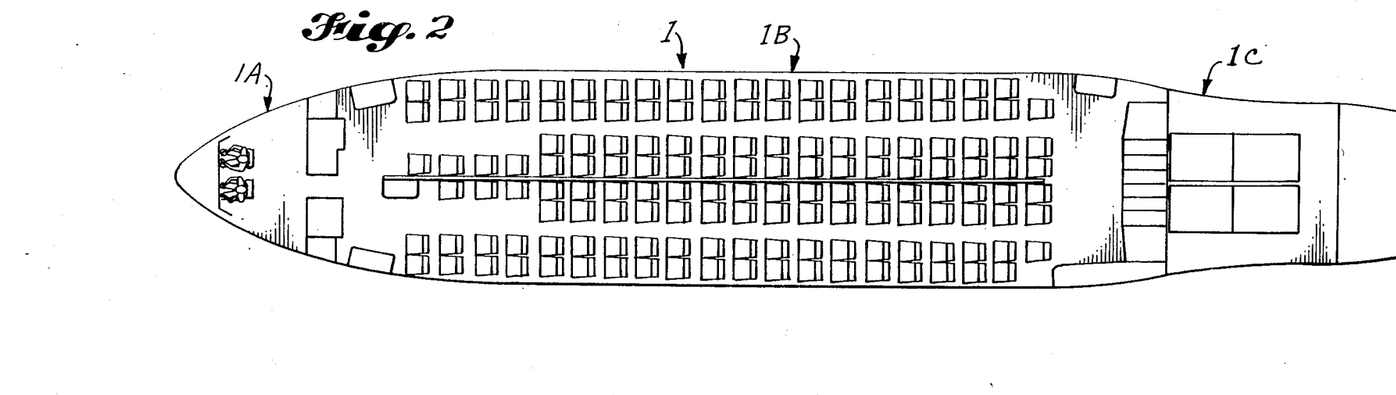
FIG. 2 is a top plan view of the fuselage section of the aircraft shown in FIG. 1 with the interior exposed to illustrate the seating arrangement for the horizontal double-lobe fuselage.
Figures 3, 4:
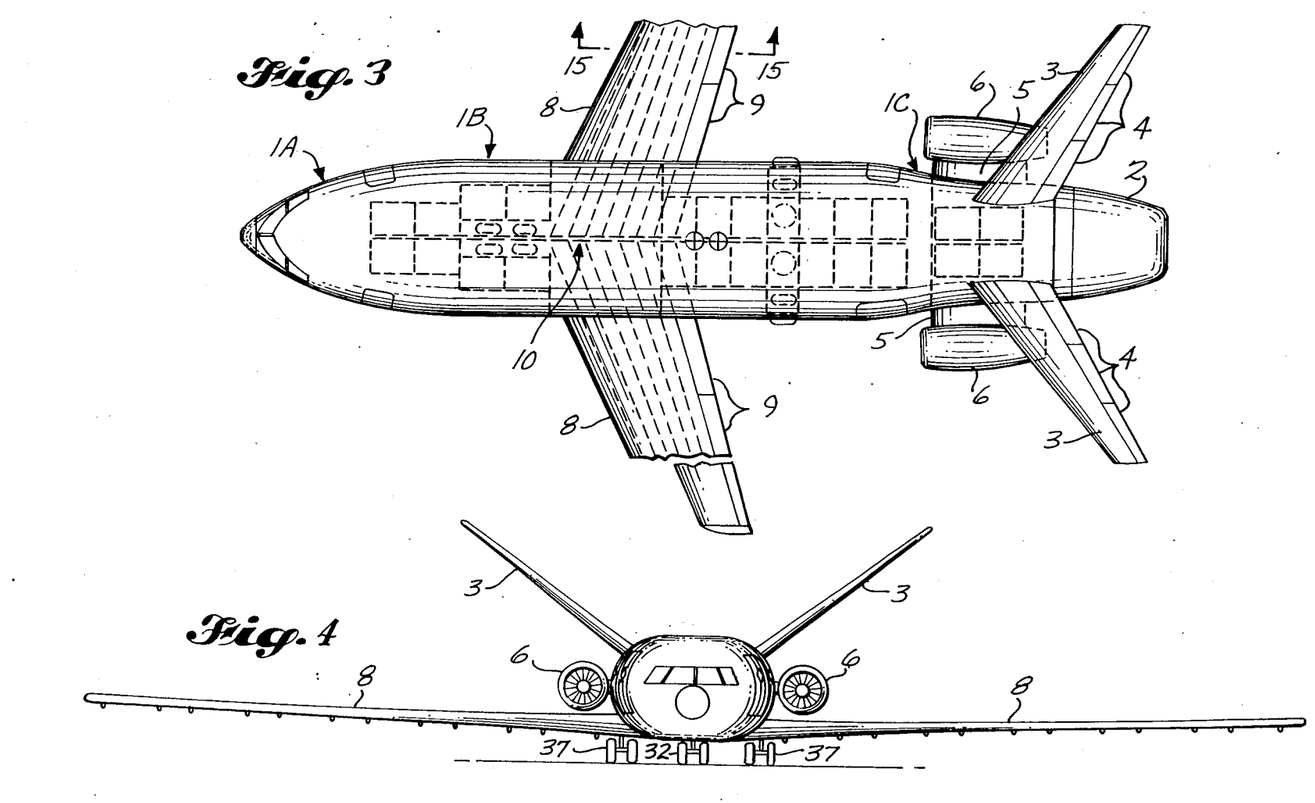
FIG. 3 is a top plan view of the aircraft shown in FIG. 1 with the span of the wing shown in partial sections.
FIG. 4 is a front elevational view of the aircraft shown in FIG. 1.

FIG. 2 is an enlarged top plan view of the fuselage illustrating an interior passage seating arrangement of the double-lobe fuselage.

Figure 5:
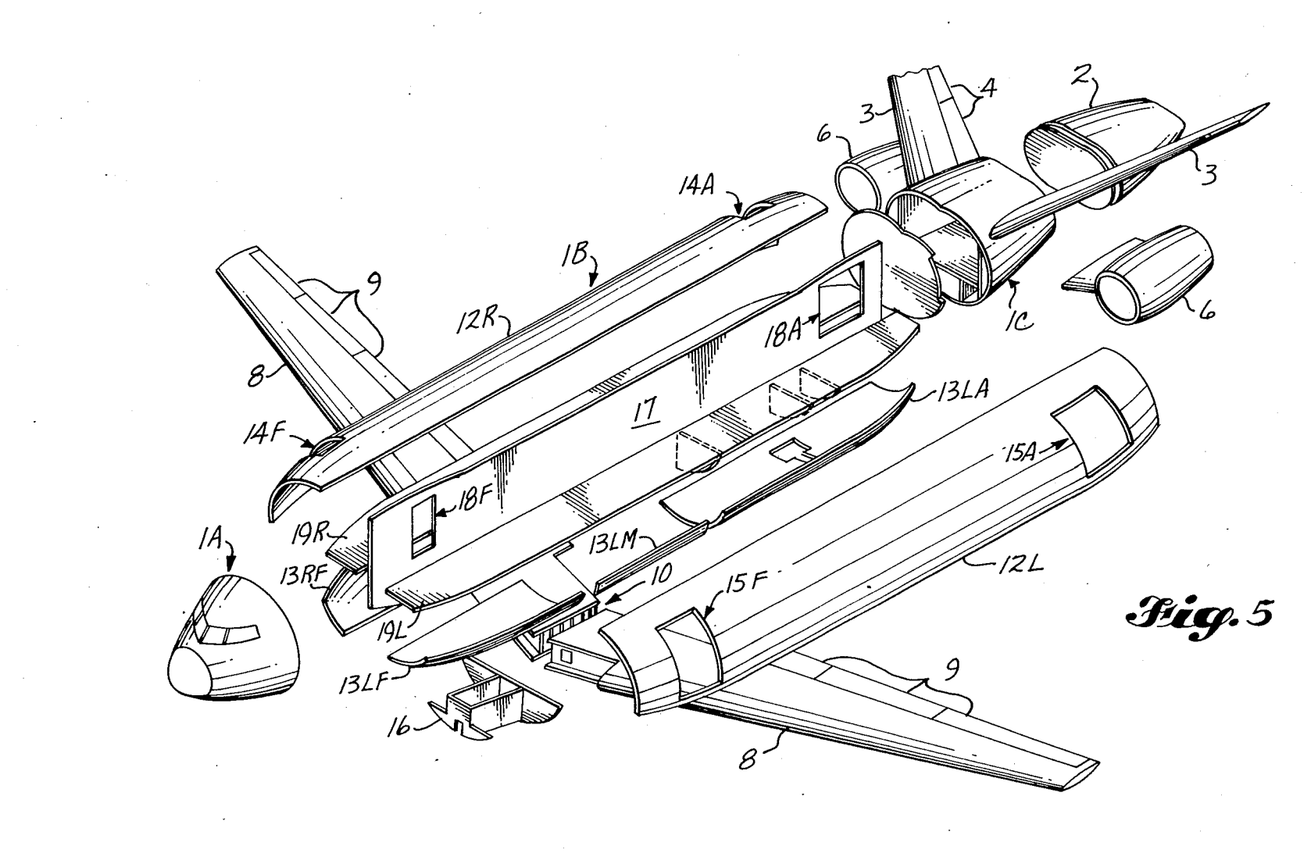
FIG. 5 is an exploded schematic illustration of pre-manufactured sections prior to their assembly into the aircraft configuration shown in FIG. 1.

FIG. 5 is an exploded schematic illustration of premanufactured composite material sections prior to their assembly into a complete airplane.

The entire nose section 1A, including a pilot's cockpit with instrument panel and console, is also made of composite material and attaches to the double-lobe fuselage as an individual module.

The body shell or lobe walls of the fuselage comprises: upper right and left lobe sections, 12R and 12L, respectively; and lower right and left lobe sections, which are further divided longitudinally into three sections; i.e.: lower left front section 13LF, lower left mid-section 13LM, lower left aft-section 13LA, and lower right front section 13RF, lower right mid-section 13RM, lower right aft-section 13RA. The upper right lobe section 12R has a fore and aft passenger door opening 14F and 14A, respectively; and the upper left lobe section 12L has a forward passenger door 15F and an aft cargo loading door 15A.

The lower forward section of the fuselage houses nose wheel well structure 16.

The interior structure of the double-lobe fuselage comprises: a vertical plane centerline web 17 having a transverse opening or throughway at both the forward and aft ends thereof, 18F and 18A, respectively; and main deck floor panels extending laterally outward from the centerline web 17 to the fuselage shell on both the left and right sides thereof, 19L and 19R, respectively.

The aft section of the fuselage 1C has a necked-in shape section with a V-tail 3; strut mounted engine nacelles 6; and a wedge shaped tail end section 2.

Figure 1:
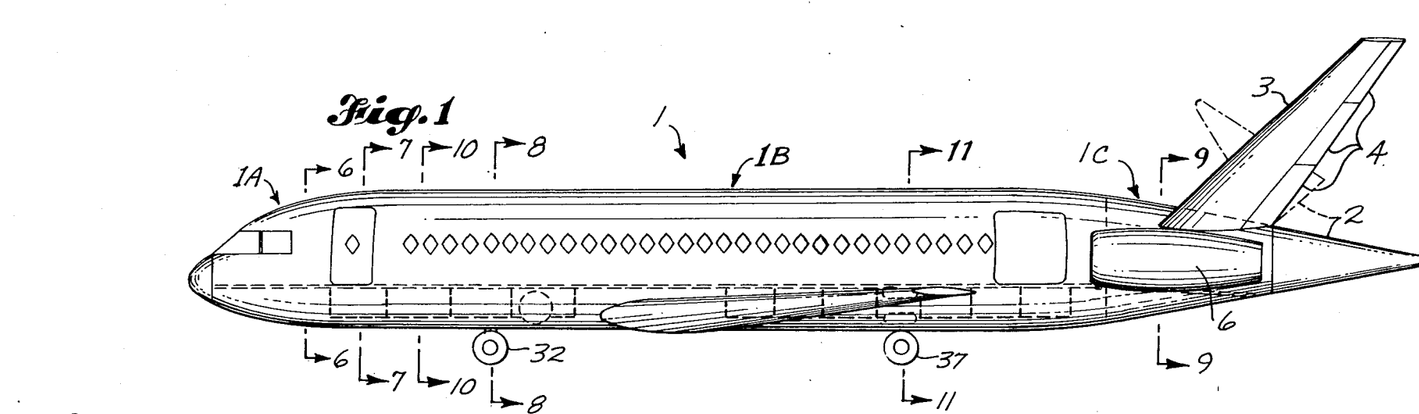
FIG. 1 is a side elevational view of a horizontal double-lobe fuselage aircraft configuration according to the present invention.

FIGS. 6 to 11 are cross-sectional views as indicated in FIG. 1.

Figure 10:
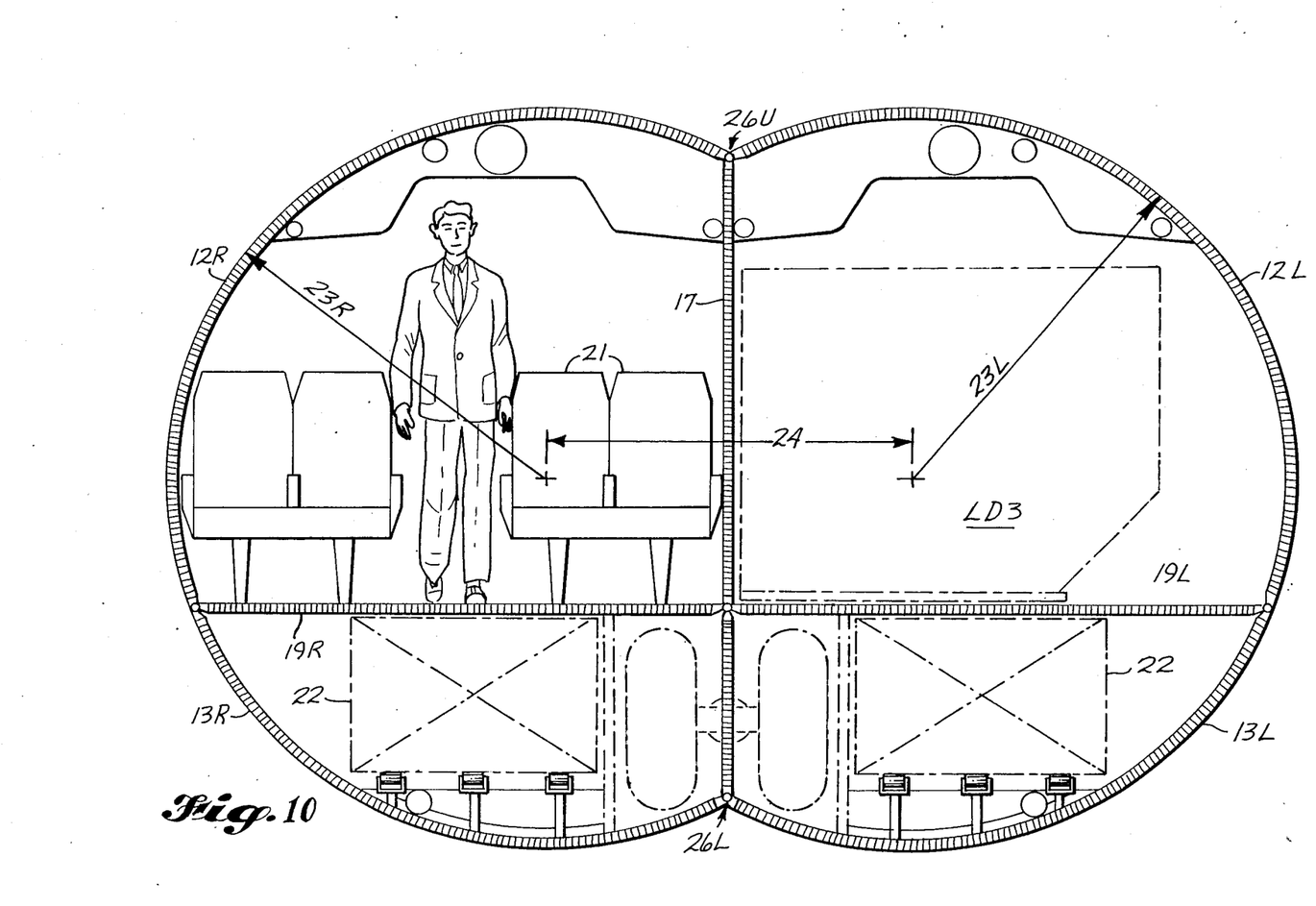
FIG. 10 is an enlarged cross-sectional view taken in the direction indicated by 8—8 of FIG. 1 and shows an interior arrangement of the double-lobe fuselage wherein one lobe has a passenger seating arrangement, and the other lobe has a cargo handling arrangement. Also shown in dash-dot outline is the nose landing gear in a retracted position.

Referring to the enlarged cross-sectional view of FIG. 10 which shows the horizontal double-lobe fuselage having a vertical centerline web 17 at the juncture of the body shells or lobes 12R and 12L. The centerline web 17 extends longitudinally within the fuselage providing a main deck interior arrangement wherein one lobe 12R or one horizontal half of the fuselage is arranged with passenger seats 21, and the horizontally adjacent lobe 12L is arranged for handling cargo such as LD-3 containers. In addition to the lateral separation of passengers and cargo, there could be a longitudinal separation arrangement. In the interior arrangement on the main deck, it is not necessary to remove any overhead structure for conversion from passenger seating to the handling of cargo containers or pallets. It only requires the removal of the passenger seats 21 in order to accommodate LD-3 cargo or pallets.

To a passenger seated within the single-lobe 12R of the fuselage, it would appear to him as though he were in a four-abreast seating arrangement with a center aisle separating the seating arrangement into pairs on either side thereof.

The centerline web 17 has lateral throughways or openings at both the fore and aft end of the main deck compartment, 18F and 18A, respectively. At the forward end, the lateral opening 18F is approximately 30" wide; and at the aft end the opening 18A is approximately 66" wide, which allows a sufficient passageway for LD-3 type containers. When the airplane is designed for cargo service, a large cargo door 15A is located aft of the double-lobe fuselage, adjacent to the aft 66" wide opening 18A through the centerline web 17. Cargo containers are brought into the airplane through the large cargo door 15A and through the aft opening 18A in the centerline web 17, and arranged fore and aft thereof. Also, for loading cargo, the wedge-shape tail end 2 of the fuselage swings up between the V-tail surfaces 3 and permits rear end loading.

Beneath the main deck 19L, 19R, of the fuselage, as shown in FIG. 10, are lower-lobe compartments which are designed for an international cargo module 22 or an "intermodal module" which is a new type of airfreight container that can be owned by the shipper. This is in contrast to the present known airfreight containers which are owned by the airlines. The shipper's ownership of the "intermodal module" 22, is an economic advantage for the airlines because they do not need to have capital tied up in these types of containers. The container weight is charged to the shipper.

The fuselage cross-section is of a horizontal double-lobe construction with substantially constant radii 23L, 23R throughout the passenger and/or cargo compartment area; however, from the constant fuselage cross-section of the passenger and/or cargo compartment, the fuselage cross-sectional area is varied toward both the fore and aft ends thereof, by varying the horizontal distance 24 between the centers of the two lobe radii 23L, 23R. This technique permits varying the fuselage cross-sectional area while maintaining the construction advantage of a constant structural radii over a major length of the fuselage. This constant radius feature is of particular importance to provide interchangeable windows, doors and interior modules.

Figure 11:
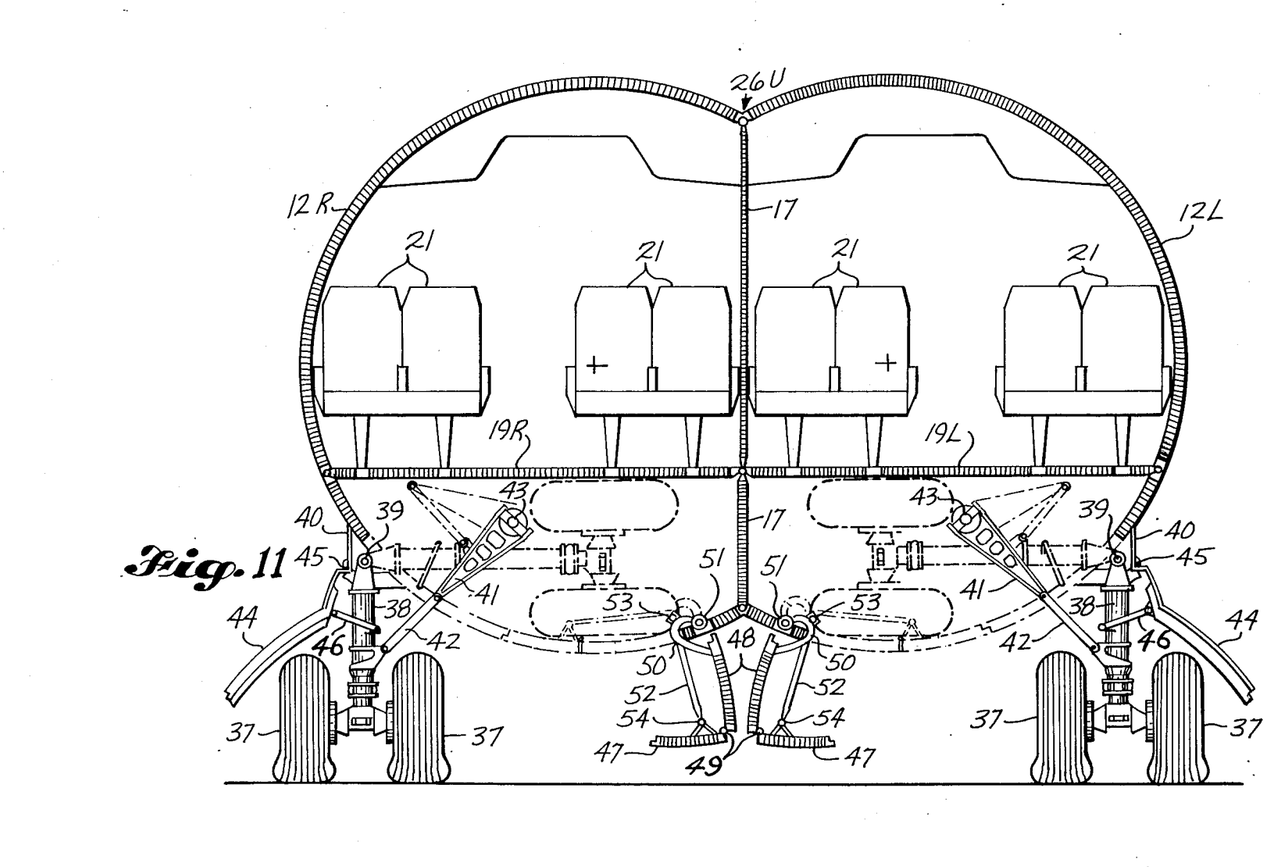
FIG. 11 is a cross-sectional view taken in the direction indicated by 11—11 of FIG. 1 and shows both lobes of the double-lobe fuselage with an interior passenger seating arrangement. Also shown is the main landing gear in an extended position (solid outline) on each side of the fuselage and in a retracted position (dash-dot outline) stowed within the lower portion of the fuselage.
Figure 12:
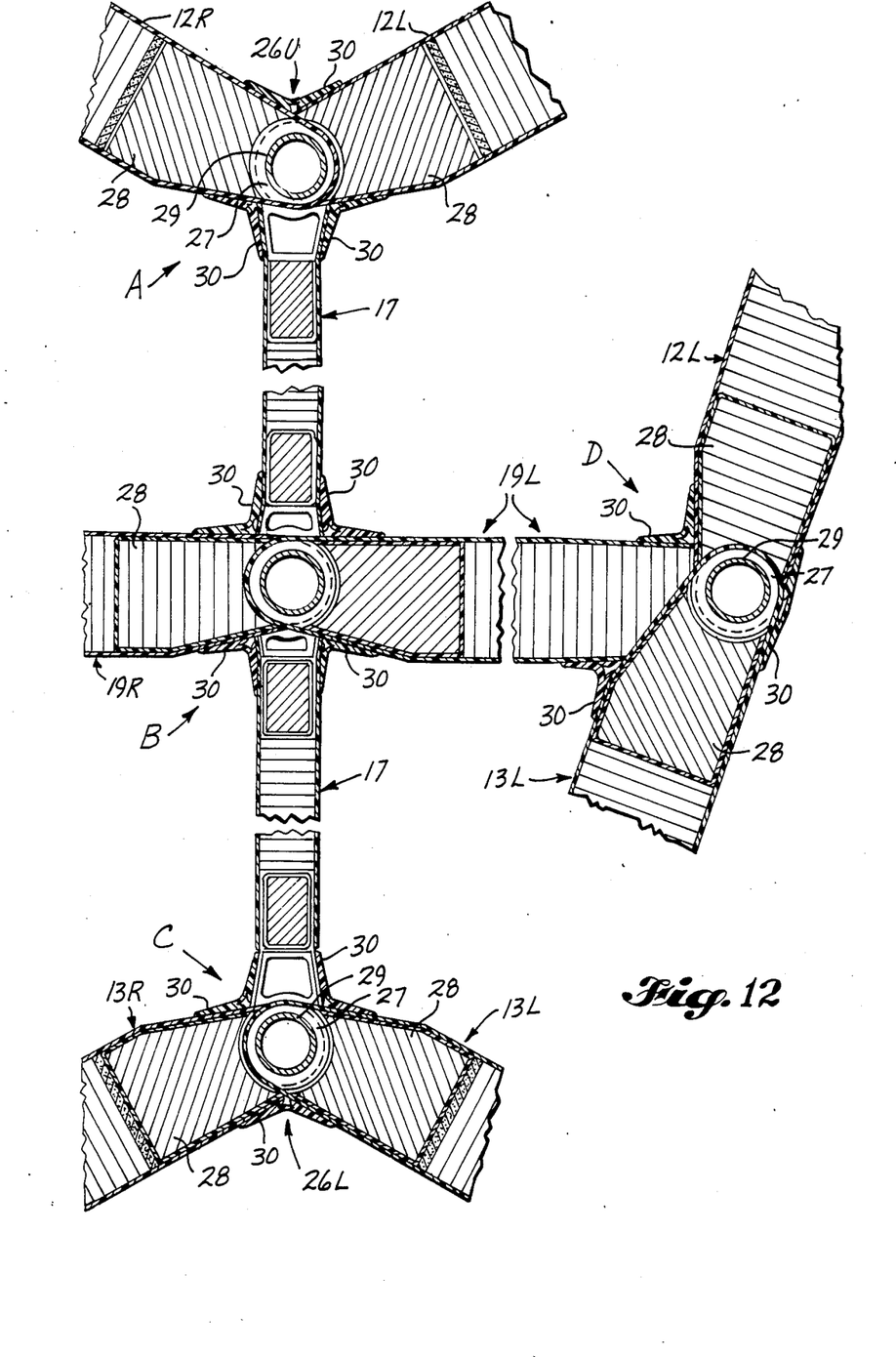
FIG. 12 is a combination of enlarged detail views of hinge joints in FIG. 11, wherein: views A and C depict the upper and lower structural hinge ties respectively for the two horizontal lobes at the centerline of the fuselage; view B depicts the structural hinge tie of the centerline web to the main floor panels; and view D depicts the juncture of the main floor panel to the side panels of the fuselage.

FIG. 12 is a compilation of enlarged cross-sectional view details of the centerline bulkhead or web, shown in FIGS. 10, 11, with its upper and lower joint connections.

FIG. 12A shows the joint located at the top of the centerline web 17 and the exterior wall panels 12R, 12L of the fuselage.

FIG. 12B shows the joining of the centerline web 17 to the main floor panels 19R, 19L which are approximately 2" thick honeycomb panels. The main floor panels 19R, 19L extend laterally outward from the centerline web joint to the shell or outer surface of the fuselage where the joint shown in FIG. 12D is formed.

FIG. 12C shows the joint located at the bottom of the centerline web 17 and the lower exterior wall panels 13R, 13L of the fuselage.

FIG. 12D shows the joint located at the juncture of the left main floor panel 19L and the left upper and lower side shells 12L and 13L, respectively, of the fuselage.

Figure 13:
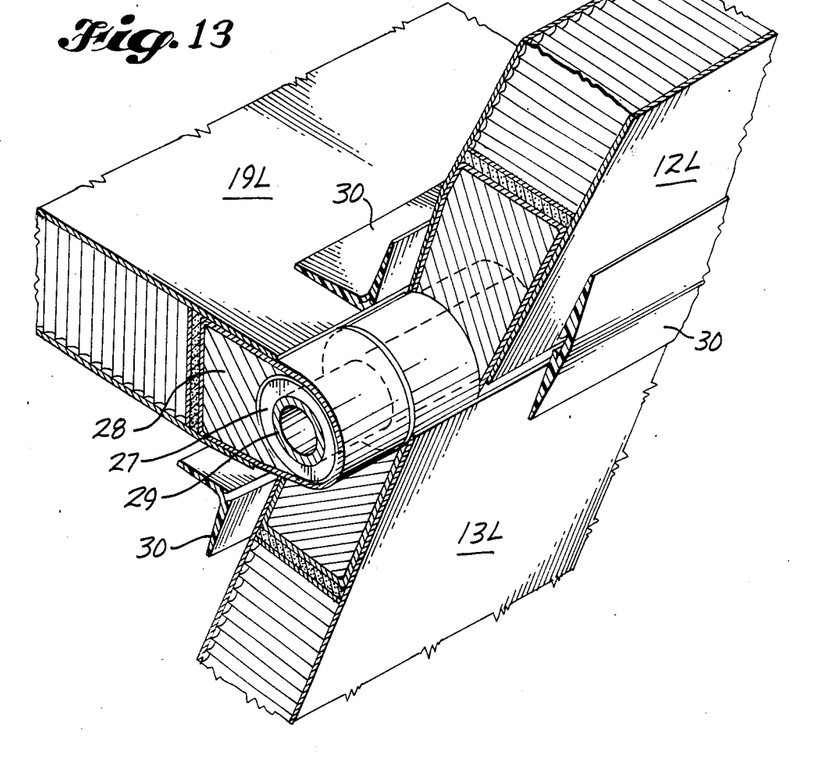
FIG. 13 is a perspective view showing the joining of three structural composite panels; and more particularly, a joint similar to that of FIG. 12D located at the juncture of the main floor panel and the side shell of the fuselage.

FIG. 13 is a perspective view showing the joining of three structural composite panels; and more particularly, the joint of FIG. 12D located at the juncture of the main floor panel 19L and side shells 12L, 13L of the fuselage.

Figure 14:
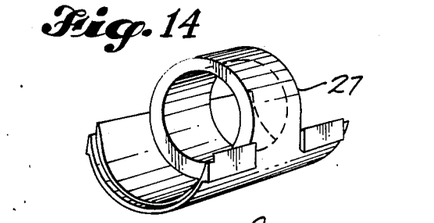
FIG. 14 is a perspective view of a typical hinge lug formed by an injection molding process.
Figure 15:
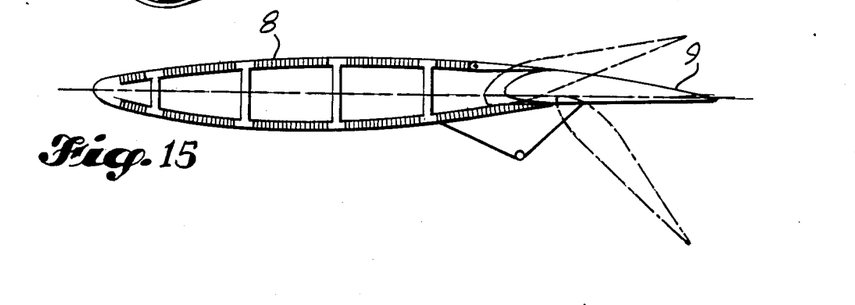
FIG. 15 is a chordwise cross-sectional view taken in the direction indicated by 15—15 of FIG. 3 and shows a multi-spar composite material construction of the wing having trailing edge flaperons.

FIG. 14 is a perspective view of a hinge lug which has been formed by an injection mold process.

Referring to FIGS. 10 to 12, the centerline web 17 and the exterior shell or hull of the fuselage are the main load carrying structures of the airplane; and they comprise graphite honeycomb core panels with biasplied layers of graphite fiber skins. The centerline web 17 is a panel approxiamtely 1" (one inch) thick of graphite epoxy honeycomb and is a structural member which extends from the top fuselage centerline connection 12A to the bottom fuselage centerline connection 12C. Detail views 12A and 12C depict the upper and lower structural hinge ties respectively, for the two horizontal lobes at the centerline of the fuselage. The stiffness efficiency of graphite material in the construction of honeycomb core composite panels allows a method of fuselage construction, wherein interior bulkheads and frame members are not necessary for carrying structural loads.

The exterior wall panels 12R, 12L, 13R, 13L, comprising the shell of the fuselage, are approximately 2¼" (two and one-quarter inches) thick, and the panels are contour molded around the girth of the fuselage. Panels 12R and 12L are one continuous segment from the top centerline of the fuselage around the sides to where they intersect with the main floor panels 19R and 19L respectively. The next continuous panel segments 13R and 13L about the fuselage girth begin from said intersections of the main floor panels 19R and 19L, and extend to the fuselage centerline under the airplane, except for where the wheel walls are located.

Between the two horizontal lobes, a longitudinal crease 26U is formed on the upper surface of the fuselage, and a longitudinal crease 26L is formed on the lower surface of the fuselage. These creases 26U and 26L do not have to be faired in, nor is fairing necessary from a structural standpoint. Also, wind tunnel test indicate that the crease produces no detrimental aerodynamic effect. However, due to possible accumulation of water and debris in the crease 26U on top of the fuselage, the crevasse is specifically designed to extend straight fore and aft of the fuselage, so that the water and debris can run off.

Fabrication techniques applicable to composite materials differ substantially from conventional aluminum or metal forming methods; and the efficient transfer of loads from composite material components through metal fasteners would complicate the design and manufacturing process. Further, the addition of metal elements would increase the number of parts in the assembly operation and also add weight. The problem is multiplied when the joints are highly stressed structural joints; and one of the most difficult problems faced in the design and manufacture of an all composite material aircraft involves joint technology, i.e., the joint technology for facilitating assembly of multi-panels of composite material.

Referring to FIG. 5, in the assembly operation of a horizontal double-lobe fuselage, one of the problems relates to the joining of the substantially long longitudinal panels 12R, 12L, 13R, 13L, that form the major length of the fuselage; because, as shown in the cross-sectional views FIGS. 6 to 9, the angle between the long longitudinal panels changes with the variation in separation distance 24, as shown in FIG. 10, between the centerlines of the lobes.

Referring to FIGS. 12 and 13, for attachment or connection of the composite panels, their edges are modified with reinforcing material 28 and have built-in hinge lugs 27 which are dimensioned to interspace along a piano-hinge type joint, i.e., the lugs 27 are spaced so that in a juncture of three panels, the space between the lugs 27 on each panel will accommodate the two lugs 27 of the other two panels. The width of each lug 27 is tailored to accommodate load distribution; and each lug 27 has a hole in it parallel to the panel to which it is attached. The joint is fastened by a tubular hinge pin 29, or a concentric series of tubes, threaded through the holes. The tubular hinge pins 29 are slid through the lugs 27 during final assembly to join the body panels, floor panels, and centerline web together.

One of the problems solved by the present invention in the design of a compact, structurally efficient joint between the lobes and the centerline bulkhead, taking into account the distribution of the loads, in order to avoid stress concentrations which are undesirable for composite structures. Fastening the body panels together along longitudinal joints using concentric multitubes (which provide greater bending flexibility for threading through the lug holes during assembly of the substantially long longitudinal joints of the double lobe fuselage) more evenly distribute the stresses in the joined panels and avoids the use of transverse splices at highly loaded locations. The highly loaded locations or point loadings also result from joining long butt-edged panels at just a few places along their edges.

An advantage of this type of construction assembly is that it allows for a variation in the joining angle of the body shells along the longitudinal body stations.

Another advantage of this type jont is that the stresses in the joined panels are more evenly distributed, as opposed to point loading which results from joining large panels at just a few places along their edges.

The joint or joining features of the present invention appears similar to a piano-type hinge, except that there is no rotary motion required. The only motion that could possibly occur would be if the panels were deflected, and this would not normally occur since the honeycomb panels are fairly rigid or stiff; and even if the panels were to deflect for some unknown reason, there would be very little deflection.

During the assembly process, however, and before the last panel is fitted into place, the partially joined panels can be rotated to permit insertion of the remaining panels.

The gaps and clearances between the hinge lugs 27 of adjacently fastened panels are sealed by a silicone rubber extrusion 30 which is bonded to the joined panel surfaces; and this seals the cabin pressure in on the interior side of the compartment and seals the weather out on the exterior side of the compartment.

Figures 6, 7, 8:
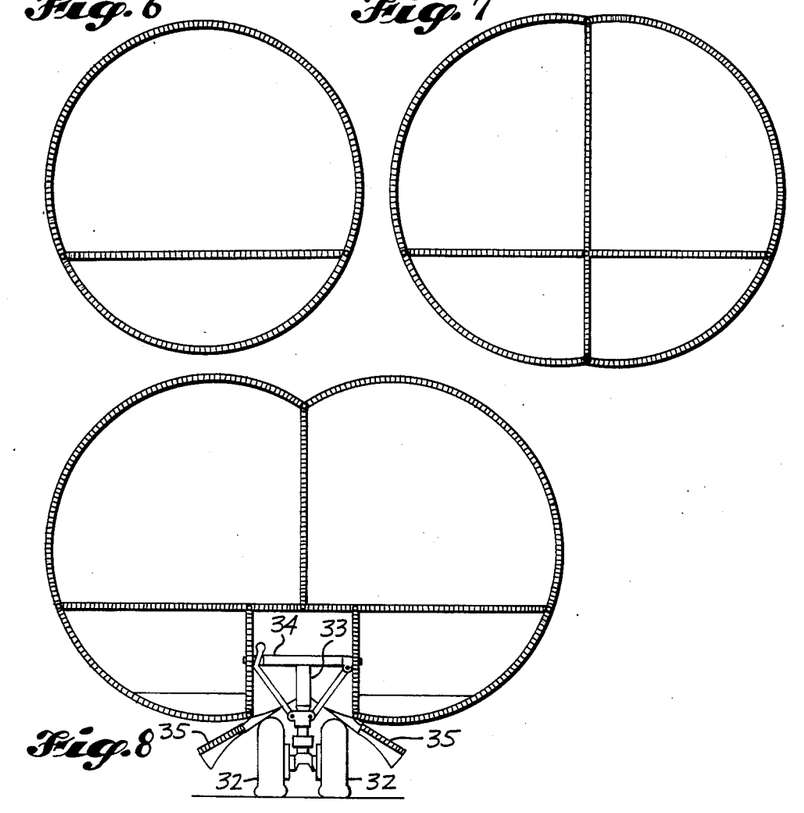
FIG. 6 is a cross-sectional view taken in the direction indicated by 6—6 of FIG. 1.
FIG. 7 is a cross-sectional view taken in the direction indicated by 7—7 of FIG. 1.
FIG. 8 is a cross-sectional view taken in the direction indicated by 8—8 of FIG. 1 and shows the nose landing gear in an extended position.
Figure 9:
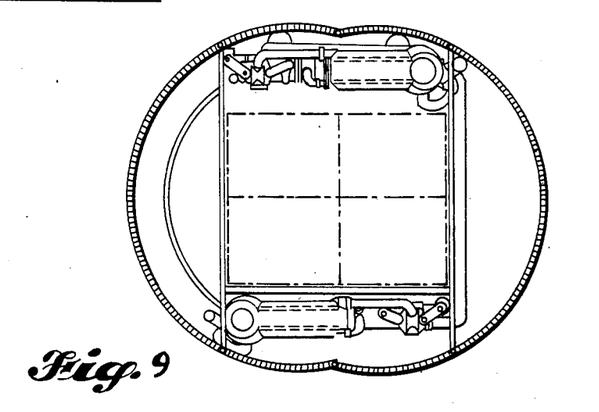
FIG. 9 is a cross-sectional view taken in the direction indicated by 9—9 of FIG. 1.

FIG. 8 is a cross-sectional view taken in the direction indicated by 8—8 of FIG. 1, showing a nose landing gear in an extended position on the longitudinal centerline of the fuselage. The nose gear comprises: a set of dual wheels 32 attached to a single central oleo shock strut 33 which is mounted to a trunnion 34. The nose gear retracts upwardly and rearwardly into the underside of the fuselage; and the doors 35 seal the opening.

FIG. 11 is a cross-sectional view taken in the direction indicated by 11—11 of FIG. 1, showing the main landing gear in an extended position on each side of the double-lobe fuselage. The double-lobe construction of the fuselage provides an adequate lateral spread within the confines of the fuselage cross-section for housing the wide-tread main landing gear. The main landing gear comprises two independently rotating wheels 37 which are attached to a single central telescoping oleo shock strut 38 which is pivotally connected at its upper end through a trunnion 39 mounting arrangement adjacent to each side of the double-lobe fuselage. The landing gear strut mechanism is equally applicable to a four-wheel truck or bogie assembly. A structural hinge support 40 for trunnion mounting the shock strut 38 to pivot about a longitudinal trunnion axis is provided at a location slightly outboard from the double-lobe fuselage corss-section; however, there is no additional aerodynamic drag penalty for this protrusion of the structural hinge support 40 because a fuselage/wing fariing (not shown) encases this area. There is no need to provide a landing gear support structure that would extend outboard of the fuselage/wind fairing for a further spread of the landing gear, as would be required for a single-lobe fuselage design and which design would also require a specifically enlarged wheel enclosure fairing.

When the main landing gear is in the extended position, the landing load path is vertically up into the sidewall structure of the fuselage. The main landing gear can be pivotally swung about the longitudinal trunnion axis, straight in toward the centerline of the fuselage during retraction operation thereof, because there is an adequate lateral spread within the confines of the fuselage envelope including the fuselage/wing fairing, to provide the structural support for trunnion mounting the main landing gear in this manner.

The retraction/extension mechanism for the main landing gear comprises a side strut arm 41 and a side strut link 42. For retraction, the side strut arm 41 is rotated upwardly from the position shown in FIG. 11, about a longitudinal pivot axis 42 by an actuator (not shown).

Closure of the landing gear opening in the fuselage, upon retraction, is provided by a landing gear side door 44 which is hinged at 45 to trunnion support structure 40 of the fuselage; and the door 44 is connected through link 46 to shock strut 38 for actuation therewith. Additional aerodynamic covering of the landing gear opening is provided by landing gear lower folding doors 47 and 48 which are hinged together at 49, and through hinge arm 50, are pivoted about a hinge axis 51 which is fixed to fuselage structure. The hinge arm 50 is rotated by an actuator (not shown) to swing the doors 47, 48, upwardly to their closed position after the main landing gear wheels 37 have been retracted. The folding action of the doors 47 and 48 is accomplished through link 52 having one end pivotally fixed at 53 to fuselage structure and the other end pivotally connected at 54 to door 47.

Further, the double-lobe fuselage, including the fuselage/wing fairing, has an adequate lateral envelope to produce a sufficient tire tread width in the extended position to avoid tip-over problems during ground maneuvering turns, so that it isn't necessary to add large blisters or bumps to the sides of the fuselage which would add drag.

The present landing gear assembly for the double-lobe fuselage is about as light as possible for an airplane for the following reasons: The trunnion mounting of the main landing gear and short oleo length permit it to be pivotally swung straight in toward the centerline of the fuselage during retraction; and the utilization of graphite fibre composite material for most of the nose gear and the main landing gear components substantially reduces the overall weight. Also, an absolute minimum length of oleo struts is required because the fuselage may not need to be rotated for takeoff or landing, and this aids in decreasing landing gear weight.

High-lift devices incorporated into the design of this airplane are clearly described in C.I.P. Ser. No. 510,738 filed July 5, 1983, by Philip C. Whitener, entitled "Control System for Incorporating Structural Feedback". The high-lift devices permit essentially flat takeoffs or landing, i.e., with the fuselage in a substantially horizontal attitude, as shown in the side view of FIG. 1. Therefore, the generally added oleo gear length for rotation of the fuselage during takeoff or landing of the airplane is minimized resulting in a substantial weight savings.

The wide seating arrangement of the double-lobe fuselage allows a reduction in the overall length of the fuselage for a given passenger capacity aircraft; and this reduced fuselage length provides a greater fuselage rotation capability for takeoff or landing.

Further, as shown in the side view of FIG. 1, the main landing gear wheels 37 are positioned sufficiently aft on the fuselage such that a fuselage rotation of approximately 15 degrees is possible for takeoff or landing.

The control system of the present airplane is designed such that when the pilot wants the airplane to take off, the trailing edge surfaces 9 and 4 of both the wing and the V-tail respectively, are deflected downwardly so that both the wing and the V-tail airfoil section have a positive camber to develop sufficient lift to take off from the ground without necessarily rotating the fuselage.

While the invention has been disclosed with reference to a preferred embodiment, it is to be understood that those modifications and changes which become obvious to a person skilled in the art to which this invention pertains, as a result of the teaching hereof, are considered to be encompassed by the following claims.

We claim:

1. A wide-body composite material constructed airplane fuselage, comprising: a fore-body section, a center-body section, and an aft-body section; and center-body section having cylindrically contoured composite material panels forming an external shell of two horizontally ajdacent lobes with equal radius-of-curvature in cross-section; a vertical plane bulkhead being of composite material panel construction and forming a longitudinal centerline interconnection between said two horizontally adjacent lobes; said composite material panels comprising a honeycomb core with a face sheet on both sides thereof; and continuous hinge joints for transmitting and redistributing structural loads from each of the face sheets through an edge intersecting, centrally positioned, common hinge axis of adjoining composite material panels, and forming longitudinal structural interconnections between said vertical-plane bulkhead and said two horizontally adjacent lobes for assembly into the center-body section of the fuselage.

2. A wide-body airplane fuselage, as set forth in claim 1, including: a main deck floor member extending horizontally outward from said vertical-plane bulkhead to the external shell of the two horizontally adjacent lobes for forming a horizontal partition in the interior thereof, and dividing each of said lobes into an upper main deck passenger compartment and a lower deck cargo compartment.

3. A wide-body airplane fuselage, as set forth in claim 1, wherein said continuous hinge joints comprise: hinge lugs formed integral with the edge of each of the joined composite material panels and being spaced apart along the edge of each of the joined panels such that the lugs of one panel edge will accommodate the lugs of the adjoining panel in a sequentially intermeshing relationship.

4. A wide-body airplane fuselage, as set forth in claim 3, wherein each of said continuous hinge joints comprise: a hinge pin having a concentric series of tubes, each tube being flexible in bending to allow for longitudinal misalignment during threading through holes in the hinge lugs and to accommodate variation in joining angle of the composite panels.

5. A wide-body composite material constructed airplane, comprising: a fuselage having a fore-body section, a center-body section and an aft-body section; said fore-body section having a flight crew cockpit; said center-body section having cylindrically contoured composite material panels forming an external shell for a pair of horizontally adjacent lobes with equal radius of curvature in cross-section; a vertical plane bulkhead being of composite material panel construction and forming a longitudinal centerline interconnection between said pair of horizontally adjacent lobes; said composite material panels comprising a honeycomb core with a face sheet on both sides thereof; continuous hinge joints for transmitting and redistributing structural loads from each of the face sheets through an edge intersecting, centrally positioned, common hinge axis of adjoining composite material panels, and forming longitudinal structural interconnections between said vertical-plane bulkhead and said pair of horizontally adjacent lobes for retaining them together in assembled relationship to complete the fuselage center-body construction; and aft-body section having engine nacelles strut mounted from the sides of the fuselage and a necked-in fuselage shape adjacent to said strut mounted engine nacelles for an aerodynamic cross-sectional design of least drag; and a wing having a high aspect ratio and being mounted to the lower portion of the fuselage such that no fuselage protrusion below the wing surface is evident.

6. A wide-body airplane, as set forth in claim 5, including: a main deck floor member extending horizontally outward from said vertical-plane bulkhead to the external shell of the two horizontally adjacent lobes for forming a horizontal partition in the interior thereof, and dividing each of said lobes into an upper main deck passenger compartment and a lower deck cargo compartment.

7. A wide-body airplane, as set forth in claim 5, wherein said continuous hinge joints comprise: hinge lugs formed integral with the edge of each of the joined composite material panels and being spaced apart edge will accommodate the lugs of the adjoining panel in a sequentially along the edge of each of the joined panels such that the lugs of one panel intermeshing relationship.

8. A wide-body airplane, as set forth in claim 7, wherein each of said continuous hinge joints comprise: a hinge pin having a concentric series of tubes, each tube being flexible in bending to allow for longitudinal misalignement during threading through holes in the hinge lugs and to accommodate variation in joining angle of the composite panels.

9. A wide-body airplane, as set forth in claim 7, including: a main landing gear structurally mounted, aft of said wing, to a trunnion adjacent each exterior side wall of the double-lobe center-body section, such that the landing load path is directed into the side-wall structure of the fuselage and for retraction operation thereof, being pivotally swung straight in toward the centerline of the fuselage.

10. A wide-body airplane, as set forth in claim 9, including: a nose landing gear structurally mounted, forward of said wing, to a trunnion on the centerline of the double-lobe center-body section, such that the landing load path is directed into the centerline web structure of the fuselage and for retraction operation thereof, being pivotally swung straight rearwardly along the centerline of the fuselage and upwardly into the underside of the fuselage.

11. A wide-body airplane, comprising: a fuselage having a fore-body section, a center-body section and an aft-body section; said fore-body section comprsing a pilot's cockpit; said center-body section having cylindrically contoured honeycomb sandwich panels forming an external shell comprising two horizontally adjacent lobes of substantially equal radius of curvature and a vertical plane centerline web of honeycomb sandwich panel construction forming a structural interconnection between said two horizontally adjacent lobes; said honeycomb sandwhich panels comprising a honeycomb core with a face sheet on both sides thereof; continuous hinge joints for transmitting and redistributing structural loads from each of the face sheets through an edge intersecting, centrally positioned, common hinge axis of adjoining honeycomb sandwich panels, and forming longitudinal structural interconnections between said vertical-plane centerline web and said two horizontally adjacent lobes for retaining them together in assembled relationship to complete the fuselage center-body construction; said aft-body section comprising engine nacelles strut mounted to the sides of the fuselage, a V-tail mounted to the top of the fuselage, and a wedge-shaped tail cone mounted aft of the strut mounted engine nacelles and said V-tail; and a wing of high-aspect ratio having its semi-span root ends structurally fastened to said centerline web such that no fuselage protrusions below the wing undersurface is evident.

12. A wide-body airplane, as set forth in claim 11, including: a piano-hinge type joint having lugs formed integral with adjoining edges of composite material panels and dimensioned to interface along their hinge axis for forming said structural interconnection between said vertical plane centerline web and said two horizontally adjacent lobes of said center-body section.

13. A wide-body airplane, as set forht in claim 11, including: a main landing gear structurally mounted, aft of said wing, to a trunnion adjacent to each exterior side wall of the double-lobe center-body section, such that the landing load path is directed into the side-wall structure of the fuselage and for retraction operation thereof, being pivotally swung straight in toward the centerline of the fuselage.

14. A wide-body airplane, as set forth in claim 11, including: a nose landing gear structurally mounted, forward of said wing, to a trunnion on the centerline of the double-lobe center-body section, such that the landing load path is directed into the centerline web structure of the fuselage, and for retraction operation thereof, being pivotally swung straight along the centerline of the fuselage and upwardly into the underside of the fuselage.

15. A wide-body airplane, as set forth in claim 11, wherein: said aft-body section has a necked-in fuselage shape adjacent to said strut mounted engine nacelles for aerodynamically integrating said strut mounted engine nacelles into a cross-sectional fuselage design of least drag.

16. A wide-body airplane as set forth in claim 11, wherein: said center-body section has a horizontal partition extending from said vertical plane centerline web, horizontally outward to the lobe side walls of the fuselage for forming a main deck floor member in the interior of the two horizontally adjacent lobes of said center-body section, and vertically dividing each side-by-side lobe into an upper main deck passenger compartment and a lower deck cargo compartment.

17. A wide-body airplane, as set forth in claim 16, including: a piano-hinge type joint having lugs formed integral with adjoining edges of composite material panels and dimensioned to interface along their hinge axis for forming a structural interconnection between said horizontal partition extending from said vertical plane centerline web and said two horizontally adjacent lobes of said center-body section.

* * * * *